United States Patent
Doushita et al.

(10) Patent No.: US 6,641,891 B2
(45) Date of Patent: Nov. 4, 2003

(54) MAGNETIC RECORDING MEDIUM

(75) Inventors: Hiroaki Doushita, Kanagawa (JP); Nobuo Yamazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 48 days.

(21) Appl. No.: 10/112,502

(22) Filed: Mar. 27, 2002

(65) Prior Publication Data

US 2003/0017365 A1 Jan. 23, 2003

(30) Foreign Application Priority Data

Mar. 28, 2001 (JP) .................................. 2001-093908
Mar. 8, 2002 (JP) .................................. 2002-063599

(51) Int. Cl.$^7$ ............................................. G11B 5/706
(52) U.S. Cl. ...................... 428/65.3; 428/328; 428/329; 428/336; 428/694 BA; 428/694 BH
(58) Field of Search .................. 428/65.3, 328, 428/329, 336, 694 BA, 694 BH

(56) References Cited

U.S. PATENT DOCUMENTS 4,438,156 A * 3/1984 Homola et al. ............. 427/474
4,859,500 A * 8/1989 Kakuta et al. ............. 427/128
5,965,194 A * 10/1999 Truong et al. ............. 427/127
6,242,085 B1 * 6/2001 Ryonai et al. ............. 428/332
6,504,365 B2 * 1/2003 Kitamura .................... 324/244

* cited by examiner

Primary Examiner—Stevan A. Resan
(74) Attorney, Agent, or Firm—Stroock & Stroock & Lavan LLP

(57) ABSTRACT

Provided is a particulate magnetic recording medium having good processing properties and being inexpensive to produce, similar to prior recording media, wherein by controlling the magnetic clusters that appear due to recording at short wavelengths and thinning of the magnetic layer, good high-density characteristics are achieved in combination with MR heads. The magnetic recording medium comprising an essentially nonmagnetic lower layer and a magnetic layer comprising a ferromagnetic powder and a binder in this order, wherein the magnetic layer has a thickness ranging from 0.01 to 0.15 $\mu$m and a coercivity equal to or higher than 159 kA/m, ferromagnetic particles contained in the ferromagnetic powder have a size less than ½ of the minimum recording wavelength, and an average size of magnetic cluster at DC erase is equal to or higher than $0.5 \times 10^4$ nm$^2$ and less than $5.5 \times 10^4$ nm$^2$.

19 Claims, No Drawings

MAGNETIC RECORDING MEDIUM

FIELD OF THE INVENTION

The present invention relates to particulate high-density magnetic recording media. More particularly, the present invention relates to a magnetic recording medium for high-density recording having a magnetic layer, an essentially nonmagnetic lower layer, and an uppermost layer comprising a ferromagnetic powder in the form of a ferromagnetic metal powder, hexagonal ferrite powder, or the like.

RELATED ART

With the widespread popularity of office computers such as minicomputers and personal computers in recent years, considerable research has been conducted into the use of magnetic tapes (so-called "backup tapes") for recording computer data as external memory devices. In the course of the practical development of magnetic tapes for such applications, particularly when combined with size reduction and increased information processing capability in computers, there has been a strong demand for increased recording capacity to achieve high-capacity recording and size reduction. Further, there has been increasing demands for the use under the wide surrounding conditions (in particular, under the conditions in which temperature and humidity are significantly varied) with increasing environments in which magnetic tapes are used, the reliability for data storage, the stable data recording and reading on multiple running by the repeated use at even higher speeds.

With the development of a multimedia society, the need for image recording is becoming increasingly strong not only in the business world, but also in the home. There is a demand for high-capacity magnetic recording media having ample ability to respond to the functional and cost requirements as a medium for recording image other than data such as text and numbers. Further, high-capacity magnetic recording media are preferably based on particulate magnetic recording media with their proven track records, affording good long-term reliability and cost performance.

The magnetic tapes employed in digital signal recording systems have been determined by system. There are magnetic tapes corresponding to so-called models DLT, 3480, 3490, 3590, QIC, model D8, and model DDS. In the magnetic tape employed in any system, a nonmagnetic support is provided on one side with a single-layer-structure magnetic layer with a relatively thick film thickness of 2.0 to 3.0 $\mu$m comprising a ferromagnetic powder, binder, and abrasives, and on the other side with a backcoat layer to prevent winding irregularity and ensure good running durability. However, these comparatively thick, single-layer-structure magnetic layers have a problem in the form of thickness loss, where output drops off.

Thinning of the magnetic layer is known to provide improvement with regard to reproduction output drop-off due to thickness loss in the magnetic layer. For example, Japanese Unexamined Patent Publication (KOKAI) Heisei No. 5-182178 discloses a magnetic recording medium in which, on a nonmagnetic support, a lower nonmagnetic layer comprising an inorganic powder dispersed in binder is provided and an upper magnetic layer equal to or less than 1.0 $\mu$m thickness comprising a ferromagnetic powder dispersed in binder is provided while the nonmagnetic layer is still wet.

Japanese Unexamined Patent Publication (KOKAI) Showa No. 64-84418 proposes the use of a vinyl chloride resin having an acid group, epoxy group, and hydroxyl group to improve the characteristics of a disk-shaped magnetic recording medium. Japanese Examined Patent Publication (KOKOKU) Heisei No. 3-12374 discloses the use of a metal micropowder with a specific surface area of 25 to 70 $m^2/g$ and an Hc equal to or higher than 79.6 kA/m (1,000 Oe). And Japanese Examined Patent Publication (KOKOKU) Heisei No. 6-28106 proposes the establishment of the specific surface area and level of magnetization of the magnetic material and the incorporation of abrasives.

To improve the durability of the magnetic recording medium, Japanese Unexamined Patent Publication (KOKAI) Showa No. 54-124716 proposes the incorporation of a nonmagnetic powder with a Mohs hardness equal to or higher than 6 and a high weight fatty acid ester, Japanese Examined Patent Publication (KOKOKU) Heisei No. 7-89407 proposes restricting the volume of voids containing lubricants and setting the surface roughness thereof to 0.005 to 0.025 $\mu$m Japanese Examined Patent Publication (KOKOKU) Heisei No. 7-36216 proposes the use of abrasives with a particle diameter of one-fourth to three-fourths the thickness of the magnetic layer and low-melting-point fatty esters, and Japanese Unexamined Patent Publication (KOKAI) Heisei No. 3-203018 proposes the use of aluminum-comprising metal magnetic material and chromium oxide.

As configurations of magnetic recording media having nonmagnetic lower layers and intermediate layers, Japanese Unexamined Patent Publication (KOKAI) Heisei No. 3-120613 proposes a configuration having an electrically conductive layer and a magnetic layer comprising metal micropowder, Japanese Unexamined Patent Publication (KOKAI) Heisei No. 6-290446 proposes a configuration having a magnetic layer equal to or less than 1 $\mu$m and a nonmagnetic layer, Japanese Unexamined Patent Publication (KOKAI) Showa No. 62-159337 proposes a configuration comprising a carbon intermediate layer and a magnetic layer comprising lubricants, and Japanese Unexamined Patent Publication (KOKAI) Heisei No. 5-290358 proposes a configuration having a nonmagnetic layer having carbon of prescribed size.

Magnetic recording media having a magnetic layer in which iron oxide, Co-modified iron oxide, $CrO_2$, ferromagnetic metal powder, and/or hexagonal ferrite powder is dispersed in binder that is coated on a nonmagnetic support are widely employed. Of these, ferromagnetic metal powders and hexagonal ferrite powders are known to have good high-density recording characteristics.

However, as the capacity and density of magnetic recording media have rapidly increased, it has become difficult to achieve satisfactory characteristics even with the above-cited art. It has also proved difficult to simultaneously achieve durability.

Magnetic heads with magnetic inductance as their operating principle (inductive magnetic heads) have been widely employed. However, limits have begun to appear in the use thereof in the area of higher density recording and reproduction. That is, to achieve high reproduction output, coil winding numbers must be employed in the reproduction head. However, there are problems in that inductance increases and resistance increases at high frequencies, resulting in a drop in reproduction output.

In recent years, one means of solving this problem has been proposed in the form of reproduction heads the operating principle of which is magnetoresistance (MR); their use in hard disks and the like has began. MR heads yield several times the reproduction output of inductive magnetic heads without employing inductive coils, permitting a substantial reduction in device noise such as inductance noise. Thus, it is possible to achieve high S/N ratios by using MR heads to reduce the noise of magnetic recording media.

High densities are generally achieved by reducing bit area, that is, recording at shorter wavelengths and narrowing the track width. However, since both short wavelength recording and narrow tracks cause a drop in output, it is difficult to ensure a good C/N ratio. Accordingly, the present inventors investigated how to achieve high output by using layered heads and MR heads in the most recent tape systems and what technologies are capable of ensuring a good C/N ratio when recording at short wavelengths and narrowing the track width.

In addition, further thinning of the magnetic layer and heightened dispersion of ferromagnetic powder were examined to achieve a magnetic recording medium corresponding to high density recording. As a result, it was determined that, as shortening recording wavelength, the magnetic particles aggregate and behave like a single large magnetic member (magnetic cluster), causing problems. That is, as recording is conducted at increasingly shorter wavelengths and the magnetic layer is made ever thinner, magnetic clusters make their appearance. As a result, there are problems in that the medium noise increases, causing the S/N and C/N ratios to drop.

SUMMARY OF THE INVENTION

Accordingly, the object of the present invention is to provide a particulate magnetic recording medium, retaining the good processing properties and inexpensive to produce, wherein by controlling the magnetic clusters that appear due to recording at short wavelengths and thinning of the magnetic layer, good high-density characteristics are achieved in combination with MR heads.

The present inventors conducted extensive research into obtaining a magnetic recording medium with good electromagnetic characteristics, in particular, in the high-density recording range, resulting in the discovery that by limiting the mean size of the magnetic clusters to a certain range, good high-density characteristics could be achieved; the present invention was devised on that basis.

That is, the present invention provides a magnetic recording medium comprising an essentially nonmagnetic lower layer and a magnetic layer comprising a ferromagnetic powder and a binder in this order, wherein said magnetic layer has a thickness ranging from 0.01 to 0.15 $\mu$m and a coercivity equal to or higher than 159 kA/m, ferromagnetic particles contained in said ferromagnetic powder have a size less than ½ of the minimum recording wavelength, and an average size of magnetic cluster at DC erase is equal to or higher than $0.5\times10^4$ nm$^2$ and less than $5.5\times10^4$ nm$^2$. The ferromagnetic particles in the ferromagnetic powder advantageously have a size of less than about 0.25 $\mu$m, 0.15 $\mu$m or even less than about 0.1 $\mu$m.

The modes of the magnetic recording medium of the present invention given below are desirable:

(1) The ferromagnetic powder contained in the magnetic layer is ferromagnetic metal powder.
(2) The ferromagnetic metal powder has a mean major axis length equal to or less than 0.08 $\mu$m and an acicular ratio equal to or higher than 5.
(3) The ferromagnetic powder contained in the magnetic layer is hexagonal ferrite powder.
(4) The hexagonal ferrite powder has a mean plate diameter equal to or less than 42 nm.
(5) The magnetic recording medium is a disk or tape for digital signal recording loaded in a device having an MR reproduction head.

According to the present invention, the magnetic recording medium having good electromagnetic characteristics, in particular, restrained medium noises in the high-density recording range can be provided that are unachievable by prior art.

The operative mechanism of the present invention will be described here.

The magnetic recording medium of the present invention comprises a magnetic powder of ultramicrograins affording high output and high dispersibility in a superthin magnetic layer, comprises an inorganic powder having spherical shape, acicular shape and the like in the lower layer, reduces the self demagnetization loss in the magnetic layer by thinning the magnetic layer, increases the output in the high-frequency range, and improves overwriting characteristics. Further, by reducing the magnetic clusters that are the minimum unit of recording, medium noise during shortwavelength recording is reduced. Due to improvement in magnetic heads, the combination with narrow gap heads better exploits the effects of a superthin magnetic layer and permits improvement in digital recording characteristics.

The thickness of the upper magnetic layer of the magnetic recording medium of the present invention falls within a range of 0.01 to 0.15 $\mu$m, preferably 0.01 to 0.10 $\mu$m, and more preferably 0.02 to 0.08 $\mu$m so as to match the performance required by high-density magnetic recording methods and magnetic heads. When the thickness of the magnetic layer is less than 0.01 $\mu$m, output drops, and when it exceeds 0.15 $\mu$m, saturation occurs during reproduction with MR heads and the C/N ratio drops.

The coercivity Hc of the upper magnetic layer is equal to or higher than 159 kA/m (2,000 Oe), preferably 159 to 318 kA/m, and more preferably 159 to 279 kA/m. When the Hc is less than 159 kA/m (2,000 Oe), the signal fluctuates during short wavelength recording and noise increases.

In the magnetic recording medium of the present invention, the average size of magnetic clusters during DC erasure is equal to or higher than $0.5\times10^4$ nm$^2$ and less than $5.5\times10^4$ nm$^2$. When the magnetic clusters increase in size, medium noise also increases, which is not suitable for achieving high density. Accordingly, a small magnetic cluster size is preferred. However, when the magnetic particles are dispersed to where magnetic clusters are eliminated, electromagnetic characteristics deteriorate due to excessive dispersion. Accordingly, in the present invention, the average size of magnetic clusters during DC erasure falls within the above-stated range.

To keep the mean size of the magnetic clusters within the range of the present invention, it is important to reduce the particle size of the magnetic material and improve dispersion properties to reduce aggregation of magnetic material. For example, methods of improving dispersion include lengthening the dispersion period, increasing the amount of binder relative to magnetic material, and improving dispersibility by using a binder in the form of a polyurethane resin or the like having a large inertial radius. By suitably combining these methods, it is possible to achieve a desired magnetic recording medium.

[The Magnetic Layer]

A high output, highly dispersible, and highly randomized ferromagnetic powder is suitably employed to achieve maximum performance of the high-capacity floppy disk or computer tape. Of these, ferromagnetic metal powders and ferromagnetic hexagonal ferrite powders are preferred because they have extremely fine particles and yield high output.

In the present invention, the ferromagnetic particles contained in the ferromagnetic powder contained in the magnetic layer have a size less than ½ of the minimum recording wavelength. The size of ferromagnetic particles contained in the ferromagnetic powder here means a major axis length for ferromagnetic metal powder, a plate diameter for hexagonal ferrite powder. The magnetic recording medium of the present invention can be recorded at a suitable wavelength, for example, at a minimum wavelength of about 0.1 to 0.5 $\mu$m. However, for the perspective of enhancing recording density, shorter recording wavelength is preferred. The minimum wavelength with the preference is 0.1 to 0.3 $\mu$m. If the ferromagnetic particle contained in the ferromagnetic powder has a size less than ½ of the minimum wavelength, there can be magnetic particles capable of magnetic inversion per 1 bit length, thereby reducing noises and permitting high electromagnetic characteristics.

The ferromagnetic powder comprised in the magnetic layer of the present invention appropriately has a specific surface area by BET method of 45 to 80 $m^2/g$, preferably 50 to 70 $m^2/g$. When the specific surface area by BET method is 45 $m^2/g$ or more, noise drops, and at 80 $m^2/g$ or less, surface properties are good. The crystallite size of the ferromagnetic powder comprised in the magnetic layer of the present invention is 80 to 180 Å, preferably 100 to 180 Å, and more preferably, 110 to 175 Å. The major axis diameter of the ferromagnetic powder is equal to or higher than 0.01 $\mu$m and equal to or less than 0.1 $\mu$m, preferably equal to or higher than 0.03 $\mu$m and equal to or less than 0.08 $\mu$m, and more preferably, equal to or higher than 0.03 $\mu$m and equal to or less than 0.07 $\mu$m.

[The Ferromagnetic Metal Powder]

The ferromagnetic powder employed in the upper magnetic layer of the present invention is preferably a ferromagnetic metal powder comprised chiefly of $\alpha$-Fe. The ferromagnetic metal powder has an acicular ratio equal to or higher than 5, preferably 5 to 12. An acicular ratio equal to or higher than 5 is desirable because magnetic anisotropy increases.

In particular, the use of a ferromagnetic metal powder with a mean major axis length equal to or less than 0.08 $\mu$m and a crystallite size of 80 to 180 Å comprising a large amount of Co and an antisintering agent in the form of Al or Y is desirable because high output and high durability can be achieved in the magnetic recording medium.

In addition to prescribed atoms, the following atoms can be contained in the ferromagnetic metal powder: Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B and the like. Particularly, the incorporation of at least one of the following in addition to a-iron is desirable: Al, Si, Ca, Y, Ba, La, Nd, Co, Ni and B, further desirably Co, Y, Al. The Co content preferably ranges from 0 to 40 atom percent, more preferably from 15 to 35 atom percent, further preferably from 20 to 35 atom percent with respect to Fe. The Y content preferably ranges from 1.5 to 12 atom percent, more preferably from 3 to 10 atom percent, further preferably from 4 to 9 atom percent. The Al content preferably ranges from 1.5 to 12 atom percent, more preferably from 3 to 10 atom percent, further preferably from 4 to 9 atom percent. These ferromagnetic metal powders may be pretreated prior to dispersion with dispersing agents, lubricants, surfactants, antistatic agents, and the like, described further below.

Specific examples are described in Japanese Examined Patent Publication (KOKOKU) Showa Nos. 44-14090, 45-18372, 47-22062, 47-22513, 46-28466, 46-38755, 47-4286, 47-12422, 47-17284, 47-18509, 47-18573, 39-10307, and 46-39639; and U.S. Pat. Nos. 3,026,215, 3,031,341, 3,100,194, 3,242,005, and 3,389,014, the contents of which are incorporated herein by reference.

The ferromagnetic metal powder may contain a small quantity of hydroxide or oxide. Ferromagnetic metal powders obtained by known manufacturing methods may be employed. The following are examples: methods of reduction with compound organic acid salts (chiefly oxalates) and reducing gases such as hydrogen; methods of reducing iron oxide with a reducing gas such as hydrogen to obtain Fe or Fe—Co particles or the like; methods of thermal decomposition of metal carbonyl compounds; methods of reduction by addition of a reducing agent such as sodium boron hydride, hypophosphite, or hydrazine to an aqueous solution of ferromagnetic metal; and methods of obtaining micropowder by vaporizing a metal in a low-pressure non-reactive gas. The ferromagnetic metal powders obtained in this manner may be subjected to any of the known slow oxidation treatments, such as immersion in an organic solvent followed by drying; the method of immersion in an organic solvent followed by formation of an oxide film on the surface by feeding in an oxygen-containing gas, then drying; and the method of forming an oxide film on the surface by adjusting the partial pressure of oxygen gas and a inert gas without using an organic solvent.

The $\sigma$s of the ferromagnetic metal powder suitably ranges from 80 to 180 A·$m^2$/kg (emu/g), preferably from 100 to 170 A·$m^2$/kg (emu/g), further preferably from 125 to 160 A·$m^2$/kg (emu/g). The coercivity of the metal powder preferably ranges from 143 to 279 kA/m (1800 to 3500 Oe), further preferably from 143 to 238 kA/m (1800 to 3000 Oe).

The moisture content of the ferromagnetic metal powder preferably ranges from 0.01 to 2 percent. The moisture content of the ferromagnetic powder is preferably optimized based on the type of binders. The pH of the ferromagnetic powder is preferably optimized based on the combination of binders employed. The range is from 4 to 12, preferably from 6 to 10. As needed, the surface of the ferromagnetic powder may be treated with Al, Si, P, or oxides thereof, and the like. The quantity thereof ranges from 0.1 to 10 weight percent with respect to the ferromagnetic powder. It is preferable that a surface treatment is applied, because the adsorption of lubricants such as fatty acids becomes equal to or less than 100 mg/$m^2$. Inorganic ions of soluble Na, Ca, Fe, Ni, Sr, and the like are sometimes incorporated into the ferromagnetic powder. It is basically desirable that these not be present, but characteristics are not particularly affected when the quantity thereof is equal to or less than 200 ppm. Further, there are desirably few pores in the ferromagnetic powder employed in the present invention; the level thereof is equal to or less than 20 volume percent, preferably equal to or less than 5 volume percent. The shape may be acicular, rice-particle shaped, or spindle-shaped so long as the above-stated characteristics about particle size are satisfied. A low SFD of the ferromagnetic powder itself is desirable, and 0.8 or less is preferable. It is necessary to narrow the Hc distribution of the ferromagnetic powder. If the SFD is equal to or less than 0.8, the excellent electromagnetic characteristics and high output are achieved and magnetization reversal is sharp and peak shifts are small, which are suited to high density digital magnetic recording. Methods of narrowing the Hc include improving the particle size distribution of the goethite and preventing sintering between particles in the ferromagnetic metal powder.

[Hexagonal Ferrite Powder]

A hexagonal ferrite powder can be used as a ferromagnetic powder employed in the magnetic layer of the present invention. Various substitution products of barium ferrite, strontium ferrite, lead ferrite, calcium ferrite, and Co substitution products or the like can be employed as the hexagonal ferrite. Specific examples are magnetoplumbite-type barium ferrite and strontium ferrite, magnetoplumbite-type ferrite, the particle surface of which is covered with spinels, and magnetoplumbite-type barium ferrite and strontium ferrite partly containing a spinel phase. The following may be incorporated in addition to other prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb and the like. Compounds to which elements such as Co—Zn, Co—Ti, Co—Ti—Zr, Co—Ti—Zn, Ni—Ti—Zn, Nb—Zn—Co, Sb—Zn—Co and Nb—Zn have been added may generally also be employed. Specific impurities are also sometimes incorporated based on the starting materials and manufacturing method. The particle size, measured as hexagonal plate diameter, ranges from 10 to 42 nm, preferably from 10 to 30 nm, particular preferably from 10 to 25 nm.

Particularly when conducting reproduction with a magnetoresistive head to improve track density, it is necessary to suppress noise. The plate diameter is desirably equal to or less than 0.04 $\mu$m, preferably 0.04 to 0.01 $\mu$m. When the plate diameter is equal to or less than 0.04 $\mu$m, noise decreases, which is desirable for high-density magnetic recording. At equal to or higher than 0.01 $\mu$m, thermal fluctuation is inhibited and stable magnetization can be achieved. The plate ratio (plate diameter/plate thickness) is suitably equal to or higher than 3, preferably 1 to 15, and more preferably, 1 to 7. When the plate ratio is equal to or higher than 3, adequate orientation properties are achieved. A plate ratio equal to or less than 15 is desirable in that stacking between grains is prevented and noise decreases. The specific surface area is generally coded as an arithmetic value calculated from the particle plate diameter and the plate thickness. The specific surface area by BET method in this particle size range is 10 to 200 m$^2$/g. Normally, a narrow distribution of particle plate diameter and plate thickness is desirable. To assign a number is difficult, but comparison is possible by randomly measuring 500 particles in a TEM photograph of particles. Although the distribution is often not a normal distribution, when calculated and denoted as the standard deviation with respect to the mean size, it is given by $\sigma$/mean size=0.1 to 0.2. To achieve a sharp particle size distribution, the particle producing reaction system is rendered as uniform as possible and the particles produced may be subjected to a distribution-enhancing treatment. For example, one known method is the graded dissolution of ultrafine particles in an acid solution. The coercivity Hc measured in the magnetic material can be made about 39.8 to 398 kA/m (500 to 5,000 Oe). Although a high Hc is advantageous to high-density recording, this is limited by the capacity of the recording head. The Hc in the present invention is equal to or higher than 159 kA/m (2,000 Oe), preferably equal to or higher than 159 kA/m (2,000 Oe), and equal to or less than 279 kA/m (3,500 Oe).

The Hc can be controlled through the particle size (plate diameter, plate thickness), the type and quantity of elements contained, the substitution site of elements, and the conditions under which the particle generating reaction is conducted. Saturation magnetization $\sigma$s is 40 to 80 A·m$^2$/kg (emu/g). Although a high $\sigma$s is desirable, it tends to decrease the smaller the particles become. It is possible to improve the $\sigma$s by compounding spinel ferrite with magnetoplumbite ferrite and by suitably selecting the type and adding quantity of various elements. It is also possible to use W-type hexagonal ferrite. The magnetic particle surface is treated with a dispersion medium or substance suited to the polymer in the course of dispersing the magnetic particles. An inorganic compound or organic compound can be employed as the surface treatment agent. Compounds of Si, Al and P, various silane coupling agents, and various titanium coupling agents are the principal compounds. The quantity is 0.1 to 10 percent with respect to the magnetic material. The pH of the magnetic material is also important to dispersion. A pH of about 4 to 12 is usually optimum for the dispersion medium and polymer, but a pH of about 6 to 11 is selected for the chemical stability and storage properties of the medium. Moisture contained in the magnetic material also affects dispersion. Although there is an optimum value for the dispersion medium and polymer, 0.01 to 2.0 percent is normally selected. Methods of manufacturing hexagonal ferrite include: (1) a vitrified crystallization method consisting of mixing into a desired ferrite composition barium oxide, iron oxide, and a metal oxide substituting for iron with a glass forming substance such as boron oxide; melting the mixture; rapidly cooling the mixture to obtain an amorphous material; reheating the amorphous material; and refining and comminuting the product to obtain a barium ferrite crystal powder; (2) a hydrothermal reaction method consisting of neutralizing a barium ferrite composition metal salt solution with an alkali; removing the by-product; heating the liquid phase to 100° C. or greater; and washing, drying, and comminuting the product to obtain barium ferrite crystal powder; and (3) a coprecipitation method consisting of neutralizing a barium ferrite composition metal salt solution with an alkali; removing the by-product; drying the product and processing it at equal to or less than 1,100° C.; and comminuting the product to obtain barium ferrite crystal powder. However, any manufacturing method can be selected in the present invention.

[The Nonmagnetic Layer]

Details of the lower layer will be described next. The magnetic recording medium of the present invention comprises an essentially nonmagnetic layer beneath the magnetic layer. Here, the term "essentially nonmagnetic" means that the layer may have magnetic properties to a degree not affected by recording. Also, the magnetic properties may be to a degree that they do not affect the recording properties of the recording layer. Below, the term "lower layer" or "nonmagnetic layer" will be employed.

The inorganic powder employed in the lower layer of the present invention is a nonmagnetic powder. It may be selected from inorganic compounds, examples of which are: metal oxides, metal carbonates, metal sulfates, metal nitrides, metal carbides, metal sulfides and the like. Examples of inorganic compounds are $\alpha$-alumina having an $\alpha$-conversion rate equal to or higher than 90 percent, $\beta$-alumina, $\gamma$-alumina, $\theta$-alumina, silicon carbide, chromium oxide, cerium oxide, $\alpha$-iron oxide, hematite, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate, and molybdenum disulfide; these may be employed singly or in combination. Particularly desirable due to their narrow particle distribution and numerous means of imparting functions are titanium dioxide, zinc oxide, iron oxide and barium sulfate. Even more preferred are titanium dioxide and a-iron oxide. The particle size of these nonmagnetic powders preferably ranges from 5 to 2000 nm, but nonmagnetic powders of differing particle size may be combined as needed, or the particle diameter distribution of a single nonmagnetic powder may be broadened to achieve the same effect. What is preferred most is a particle size in the nonmagnetic powder ranging from 10 to 200 nm. Particularly when the nonmagnetic powder is a granular metal oxide, a mean particle diameter equal to or less than 80 nm is preferred, and when an acicular metal oxide, a major axis length equal to or less than 300 nm is preferred and equal to or less than 200 nm is further preferred. The tap density ranges from 0.05 to 2 g/ml, preferably from 0.2 to 1.5 g/ml. The moisture content of the nonmagnetic powder ranges from 0.1 to 5 weight percent, preferably from 0.2 to 3 weight percent, further preferably from 0.3 to 1.5 weight percent. The pH of the nonmagnetic powder ranges from 2 to 11, and the pH between 5.5 to 10 is particular preferred. The specific surface area of the nonmagnetic powder ranges from 1 to 100 $m^2$/g, preferably from 5 to 80 $m^2$/g, further preferably from 10 to 70 $m^2$/g. The crystallite size of the nonmagnetic powder preferably ranges from 4 nm to 1 $\mu$m, further preferably from 40 to 100 nm. The oil absorption capacity using dibutyl phthalate (DBP) ranges from 5 to 100 ml/100 g, preferably from 10 to 80 ml/g, further preferably from 20 to 60 ml/100 g. The specific gravity ranges from 1 to 12, preferably from 3 to 6. The shape may be any of acicular, spherical, polyhedral, or plate-shaped. The Mohs hardness is preferably equal to or higher than 4 and equal to or less than 10. The stearic acid (SA) adsorption capacity of the nonmagnetic powders ranges from 1 to 20 $\mu$mol/$m^2$, preferably from 2 to 15 $\mu$mol/$m^2$, further preferably from 3 to 8 $\mu$mol/$m^2$. The pH between 3 to 6 is preferred. The surface of these nonmagnetic powders is preferably treated with $Al_2O_3$, $SiO_2$, $TiO_2$, $ZrO_2$, $SnO_2$, $Sb_2O_3$, ZnO and $Y_2O_3$. Those of preference with regard to dispersibility are $Al_2O_3$, $SiO_2$, $TiO_2$, and $ZrO_2$, and $Al_2O_3$, $SiO_2$ and $ZrO_2$ are further preferable. These may be used singly or in combination. Depending on the objective, a surface-treatment coating layer with a coprecipitated material may also be employed, the coating structure which comprises a first alumina coating and a second silica coating thereover or the reverse structure thereof may also be adopted. These may be employed singly or in combination. Depending on the objective, the surface-treatment coating layer may be a porous layer, with homogeneity and density being generally desirable.

Specific examples of nonmagnetic powders suitable for use in the lower layer of the present invention are: Nanotite from Showa Denko K. K.; HIT-100 and ZA-G1 from Sumitomo Chemical Co., Ltd.; α-hematite DPN-250, DPN-250BX, DPN-245, DPN-270BX, DPN-500BX, DPN-SA1 and DPN-SA3 from Toda Kogyo Corp.; titanium oxide TTO-51B, TTO-55A, TTO-55B, TTO-55C, TTO-55S, TTO-55D, SN-100, α-hematite E270, E271, E300 and E303 from Ishihara Sangyo Co., Ltd.; titanium oxide STT-4D, STT-30D, STT-30, STT-65C, and α-hematite α-40 from Titan Kogyo K. K.; MT-100S, MT-100T, MT-150W, MT-500B, MT-600B, MT-100F, and MT-500HD from Tayca Corporation; FINEX-25, BF-1, BF-10, BF-20, and ST-M from Sakai Chemical Industry Co., Ltd.; DEFIC-Y and DEFIC-R from Dowa Mining Co., Ltd.; AS2BM and TiO2P25 from Nippon Aerogil; 100A and 500A from Ube Industries, Ltd.; and sintered products of the same. Particular preferable nonmagnetic powders are titanium dioxide and α-iron oxide.

Mixing carbon black into the lower layer achieves the known effects of lowering surface resistivity Rs and reducing light transmittance, as well as yielding the desired micro Vickers hardness. Further, the incorporation of carbon black into the lower layer can also serve to store lubricants. Examples of types of carbon black that are suitable for use are furnace black for rubber, thermal for rubber, black for coloring and acetylene black. Based on the effect desired, the following characteristics can be optimized in the carbon black in the lower nonmagnetic layer, and effects can be achieved by using different carbon blacks in combination.

The specific surface area of carbon black employed in the lower layer ranges from 100 to 500 $m^2$/g, preferably from 150 to 400 $m^2$/g and the DBP oil absorption capacity ranges from 20 to 400 ml/100 g, preferably from 30 to 400 ml/100 g. The particle diameter of carbon black ranges from 5 to 80 nm, preferably from 10 to 50 nm, further preferably from 10 to 40 nm. It is preferable for carbon black that the pH ranges from 2 to 10, the moisture content ranges from 0.1 to 10% and the tap density ranges from 0.1 to 1 g/ml. Specific examples of types of carbon black suitable for use in the present invention are: BLACK PEARLS 2000, 1300, 1000, 900, 800, 880, 700 and VULCAN XC-72 from Cabot Corporation; #3050B, #3150B, #3250B, #3750B, #3950B, #950, #650B, #970B, #850B, MA-600, MA-230, #4000 and #4010 from Mitsubishi Chemical Corporation; CONDUCTEX SC, RAVEN 8800, 8000, 7000, 5750, 5250, 3500, 2100, 2000, 1800, 1500, 1255 and 1250 from Columbia Carbon Co., Ltd.; and Ketjen Black EC from Lion Akzo Co., Ltd. The carbon black employed can be surface treated with a dispersing agent or the like, grafted with a resin, or a portion of the surface may be graphite-treated. Further, the carbon black may be dispersed with a binder prior to being added to the coating material. These types of carbon black are employed in a range that does not exceed 50 weight percent with respect to the inorganic powder above and does not exceed 40 percent with respect to the total weight of the nonmagnetic layer. These types of carbon black may be employed singly or in combination. The *Carbon Black Handbook* compiled by the Carbon Black Association may be consulted for types of carbon black suitable for use in the present invention.

Based on the objective, an organic powder may be added to the lower layer. Examples are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 maybe employed.

As regards binder resins, lubricants, dispersants, and additives; solvents; dispersion methods and the like of the lower layer, those of magnetic layers can be applied. In particular, the techniques known with regard to magnetic layers may be applied to the quantity and types of binders, additives, and dispersants added.

[Binder]

In addition to the binders, lubricants, dispersants, additives, solvents, dispersion methods, and the like of the nonmagnetic layer, backcoat layer (when there is a backcoat layer), and magnetic layer of the present invention, those normally employed in magnetic layers, nonmagnetic layers, and backcoat layers may be applied. In particular, known techniques relating to magnetic layers may be applied to the quantity and types of binders, additives, and dispersants added.

Conventionally known thermoplastic resins, thermosetting resins, reactive resins and mixtures thereof may be employed as binders used in the present invention. The thermoplastic resins suitable for use have a glass transition temperature of −100 to 150° C., a number average molecular weight of 1,000 to 200,000, preferably from 10,000 to 100,000, and have a degree of polymerization of about 50 to 1,000.

Examples are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins. Further, examples of thermosetting resins and reactive resins are phenol resins, epoxy resins, polyurethane cured resins, urea resins, melanine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. These resins are described in detail in the *Handbook of Plastics* published by Asakura Shoten. It is also possible to employ known electron beam-cured resins in individual layers. Examples thereof and methods of manufacturing the same are described in detail in Japanese Unexamined Patent Publication (KOKAI) Showa No. 62-256219. The above-listed resins may be used singly or in combination. Preferred resins are combinations of polyurethane resin and at least one member selected from the group consisting of vinyl chloride resin, vinyl chloride—vinyl acetate copolymers, vinyl chloride—vinyl acetate—vinyl alcohol copolymers, and vinyl chloride—vinyl acetate—maleic anhydride copolymers, as well as combinations of the same with polyisocyanate.

Known structures of polyurethane resin can be employed, such as polyester polyurethane, polyether polyurethane, polyether polyester polyurethane, polycarbonate polyurethane, polyester polycarbonate polyurethane, and polycaprolactone polyurethane. To obtain better dispersibility and durability in all of the binders set forth above, it is desirable to introduce by copolymerization or addition reaction one or more polar groups selected from among —COOM, —$SO_3M$, —$OSO_3M$, —$P=O(OM)_2$, —O—$P=O(OM)_2$, (where M denotes a hydrogen atom or an alkali metal), OH, $NR_2$, $N^+R_3$ (where R denotes a hydrocarbon group), epoxy groups, SH, and CN. The quantity of the polar group is from $10^{-1}$ to $10^{-8}$ mol/g, preferably from $10^{-2}$ to $10^{-6}$ mol/g.

Specific examples of the binders employed in the present invention are VAGH, VYHH, VMCH, VAGF, VAGD, VROH, VYES, VYNC, VMCC, XYHL, XYSG, PKHH, PKHJ, PKHC, and PKFE from Union Carbide Corporation; MPR-TA, MPR-TA5, MPR-TAL, MPR-TSN, MPR-TMF, MPR-TS, MPR-TM, and MPR-TAO from Nisshin Kagaku Kogyo K. K.; 1000W, DX80, DX81, DX82, DX83, and 100FD from Denki Kagaku Kogyo K. K.; MR-104, MR-105, MR110, MR100, MR555, and 400X-110A from Nippon Zeon Co., Ltd.; Nippollan N2301, N2302, and N2304 from Nippon Polyurethane Co., Ltd.; Pandex T-5105, T-R3080, T-5201, Burnock D-400, D-210-80, Crisvon 6109, and 7209 from Dainippon Ink and Chemicals Incorporated.; Vylon UR8200, UR8300, UR-8700, RV530, and RV280 from Toyobo Co., Ltd.; Daipheramine 4020, 5020, 5100, 5300, 9020, 9022, and 7020 from Dainichiseika Color & Chemicals Mfg. Co., Ltd.; MX5004 from Mitsubishi Chemical Corporation; Sanprene SP-150 from Sanyo Chemical Industries, Ltd.; and Saran F310 and F210 from Asahi Chemical Industry Co., Ltd.

The binder employed in the nonmagnetic layer and magnetic layer of the present invention is suitably employed in a range of 5 to 50 percent, preferably from 10 to 30 percent with respect to the nonmagnetic powder or the magnetic powder. Vinyl chloride resin, polyurethane resin, and polyisocyanate are preferably combined within the ranges of: 5 to 30 percent for vinyl chloride resin, when employed; 2 to 20 percent for polyurethane resin, when employed; and 2 to 20 percent for polyisocyanate. However, when a small amount of dechlorination causes head corrosion, it is also possible to employ polyurethane alone, or employ polyurethane and isocyanate alone. In the present invention, when polyurethane is employed, a glass transition temperature of −50 to 150° C., preferably 0 to 100° C., an elongation at break of 100 to 2,000 percent, a stress at break of 0.00049 to 0.098 GPa (0.05 to 10 kg/mm$^2$), and a yield point of 0.00049 to 0.098 GPa (0.05 to 10 kg/mm$^2$) are desirable.

The magnetic recording medium according to the present invention comprises at least two layers. Accordingly, the quantity of binder; the quantity of vinyl chloride resin, polyurethane resin, polyisocyanate, or some other resin in the binder; the molecular weight of each of the resins forming the magnetic layer; the quantity of polar groups; or the physical characteristics or the like of the above-described resins can naturally be different in the nonmagnetic layer and each of the magnetic layers as required. These should be optimized in each layer. Known techniques for a multilayered magnetic layer may be applied. For example, when the quantity of binder is different in each layer, increasing the quantity of binder in the magnetic layer effectively decreases scratching on the surface of the magnetic layer. To achieve good head touch, the quantity of binder in the nonmagnetic layer can be increased to impart flexibility.

Examples of polyisocyanates suitable for use in the present invention are tolylene diisocyanate, 4,4'-diphenylmethane diisocyanate, hexamethylene diisocyanate, xylylene diisocyanate, napthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co., Ltd.; and Desmodule L, Desmodule IL, Desmodule N and Desmodule HL manufactured by Sumitomo Bayer Co., Ltd. They can be used singly or in combinations of two or more in all layers by exploiting differences in curing reactivity.

[Carbon Black, Abrasive]

Examples of types of carbon black that are suitable for use in the magnetic layer of the present invention are: furnace black for rubber, thermal for rubber, black for coloring and acetylene black. A specific surface area of 5 to 500 m$^2$/g, a DBP oil absorption capacity of 10 to 400 mL/100 g, a mean particle diameter of 5 to 300 nm, a pH of 2 to 10, a moisture content of 0.1 to 10 percent, and a tap density of 0.1 to 1 g/mL are desirable. Specific examples of types of carbon black employed in the present invention are: BLACK PEARLS 2000, 1300, 1000, 900, 905, 800, 700 and VULCAN XC-72 from Cabot Corporation; #80, #60, #55, #50 and #35 manufactured by Asahi Carbon Co., Ltd.; #2400B, #2300, #900, #1000, #30, #40 and #10B from Mitsubishi Chemical Corporation; CONDUCTEX SC, RAVEN 150, 50, 40, 15 and RAVEN MT-P from Columbia Carbon Co., Ltd.; and Ketjen Black EC from Lion Akzo Co., Ltd. The carbon black employed may be surface-treated with a dispersant or grafted with resin, or have a partially graphite-treated surface. The carbon black may be dispersed in advance into the binder prior to addition to the magnetic coating material. These carbon blacks may be used singly or in combination. When employing carbon black, the quantity preferably ranges from 0.1 to 30 percent with respect to the magnetic material. In the magnetic layer, carbon black works to prevent static, reduce the coefficient of friction, impart light-blocking properties, enhance film strength, and the like; the properties vary with the type of carbon black employed. Accordingly, the type, quantity, and combination of carbon blacks employed in the present invention may be determined separately for the upper magnetic layer and the lower nonmagnetic layer based on the objective and the various characteristics stated above, such as particle size, oil absorption capacity, electrical conductivity, and pH, and be optimized for each layer. For example, the *Carbon Black Handbook* compiled by the Carbon Black Association may be consulted for types of carbon black suitable for use in the magnetic layer of the magnetic recording medium of the present invention.

Known materials, chiefly with a Mohs hardness equal to or higher than 6, such as α-alumina having an a-conversion rate equal to or higher than 90 percent, β-alumina, silicon carbide, chromium oxide, cerium oxide, α-iron oxide, corundum, artificial diamond, silicon nitride, titanium carbide, titanium oxide, silicon dioxide, and boron nitride, may be used singly or in combination as abrasives in the present invention. Further, a composite comprising two or more of these abrasives (an abrasive obtained by surface-treating one abrasive with another) may also be used. Although these abrasives may contain compounds and elements other than the main component or element in some cases, there is no change in effect so long as the main component constitutes equal to or higher than 90 percent. The mean particle size of these abrasives preferably ranges from 0.01 to 2 μm, a narrow particle size distribution being particularly desirable for improving electromagnetic characteristics. As needed to improve durability, abrasives of differing particle size may be combined or the same effect may be achieved by broadening the particle diameter distribution even with a single abrasive. A tap density of 0.3 to 2 g/mL, a moisture content of 0.1 to 5 percent, a pH of 2 to 11, and a specific surface area of 1 to 30 m$^2$/g are desirable. The abrasive employed in the present invention may be any of acicular, spherical, or cubic in shape, but shapes that are partially angular have good abrasion properties and are thus preferred. Specific examples: AKP-10, AKP-15, AKP-20, AKP-30, AKP-50, HIT-20, HIT-30, HIT-55, HIT-60, HIT-70, HIT-80 and HIT-100 from Sumitomo Chemical Co., Ltd.; ERC-DBM, HP-DBM, and HPS-DBM from Reynolds Co.; WA10000 from Fujimi Abrasives Co.; UB20 from Kamimura Kogyo Co., Ltd.; G-5, Chromex U2, and Chromex U1 from Nippon Chemical Industrial Co., Ltd.; TF100 and TF-140 from Toda Kogyo Corp.; Beta Random Ultrafine from Ibidene Co.; and B-3 from Showa Mining Co., Ltd. As needed, these abrasives may be added to the nonmagnetic layer. Addition to the nonmagnetic layer permits control of surface shape and control of the manner in which the abrasive protrudes. It is, as a matter of course, preferred that the particle diameter and quantity of abrasive added to the magnetic layer and nonmagnetic layer are optimally established.

[Additives]

Substances having lubricating effects, antistatic effects, dispersive effects, plasticizing effects, or the like may be employed as additives in the magnetic layer and nonmagnetic layer of present invention. In particular, in the present invention, said lower layer and/or said magnetic layer preferably comprise at least fatty acid and fatty acid ester which have the same fatty acid residues. Example of fatty acid is monobasic fatty acid having 10 to 24 carbon atoms (which may contain an unsaturated bond or be branched). Examples of fatty acid ester is monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); fatty acid esters of monoalkyl ethers of alkylene oxide polymers. Examples of additives other than these fatty acids and fatty acid esters are: molybdenum disulfide; tungsten graphite disulfide; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; phenylphosphonic acid; α-naphthylphosphoric acid; phenylphosphoric acid; diphenylphosphoric acid; p-ethylbenzenephosphonic acid; phenylphosphinic acid; aminoquinones; various silane coupling agents and titanium coupling agents; fluorine-containing alkyl sulfuric acid esters and their alkali metal salts; monobasic fatty acids (which may contain an unsaturated bond or be branched) having 10 to 24 carbon atoms and metal salts (such as Li, Na, K, and Cu) thereof; monohydric, dihydric, trihydric, tetrahydric, pentahydric or hexahydric alcohols with 12 to 22 carbon atoms (which may contain an unsaturated bond or be branched); alkoxy alcohols with 12 to 22 carbon atoms (which may contain an unsaturated bond or be branched); fatty acid amides with 8 to 22 carbon atoms; and aliphatic amines with 8 to 22 carbon atoms.

Specific examples of these fatty acids are: capric acid, caprylic acid, lauric acid, myristic acid, palmitic acid, stearic acid, behenic acid, oleic acid, elaidic acid, linolic acid, linolenic acid, and isostearic acid. Examples of fatty acid esters are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentylglycol didecanoate, and ethylene glycol dioleyl. Examples of alcohols are oleyl alcohol, stearyl alcohol, and lauryl alcohol. It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines. Details of these surfactants are described in *A Guide to Surfactants* (published by Sangyo Tosho K. K.). These lubricants, antistatic agents and the like need not be 100 percent pure and may contain impurities, such as isomers, unreacted material, by-products, decomposition products, and oxides in addition to the main components. These impurities preferably comprise equal to or less than 30 percent, and more preferably equal to or less than 10 percent.

The lubricants and surfactants employed in the present invention each have different physical effects. The type, quantity, and combination ratio of lubricants producing synergistic effects should be optimally set for a given objective. It is conceivable to control bleeding onto the surface through the use of fatty acids having different melting points in the nonmagnetic layer and the magnetic layer; to control bleeding onto the surface through the use of esters having different boiling points, melting points, and polarity; to improve the stability of coatings by adjusting the quantity of surfactant; and to increase the lubricating effect by increasing the amount of lubricant in the intermediate layer. The present invention is not limited to these examples. Generally, a total quantity of lubricant ranging from 0.1 to 50 percent, preferably from 2 to 25 percent with respect to the magnetic material or nonmagnetic powder is preferred.

Multiple lubricants producing good effects in use environments of various temperature and humidity are combined for use, with individual lubricants performing functions over a wide range of temperatures (low temperature, room temperature, high temperature) and humidity (low humidity, high humidity), so that overall, a stable lubricating effect is maintained.

A two-layer, upper and lower layer structure can be employed. The lubricant tank effect can be imparted to the lower layer so that a suitable amount of lubricant is constantly being supplied to the magnetic layer, thereby increasing the durability of the magnetic layer. The quantity of lubricant that can be contained in an ultrathin magnetic layer is limited. Simply thinning the magnetic layer reduces the absolute quantity of lubricant and leads to deterioration of running durability. Thus, it was difficult to ensure a balance between the two. Imparting different functions to an upper and a lower layer so that they complement each other makes it possible to achieve both improved electromagnetic characteristics and durability. The division of functions is particularly effective in systems in which a magnetic head and a medium slide against each other at high speed.

Durability is an important element in the magnetic recording medium. In particular, to achieve a high transfer rate, ensuring the durability of the medium when magnetic head/internal cartridge parts and the medium slide against each other at high speed is an important problem. Means of increasing the durability of the medium include adjusting the binder formulation and surface roughness to increase the film strength of the medium itself and adjusting the lubricant formulation to maintain good sliding properties with the magnetic head. In the medium of the present invention, an improved version of the proven three-dimensional network binder system employed in current floppy disk systems is employed as the binder formulation. Composite lubricants capable of maintaining effective operation in use environments of various temperature and humidity and during high-speed rotation are distributed to the upper and lower layers and the lower layer is assigned the role of lubricant tank, constantly supplying the upper magnetic layer with a suitable quantity of lubricant and improving the durability and reliability of the upper layer. The cushioning effect of the lower layer can be used to impart good head touch and stable running properties.

In addition to the function of maintaining lubricant, the lower layer can be imparted with the function of controlling surface resistivity. To control resistivity, a solid electrically conductive material such as carbon black is usually added to the magnetic layer. This not only limits any increase in the packing density of the magnetic material, but also affects surface roughness as the magnetic layer is thinned. These drawbacks can be eliminated by adding an electrically conductive material to the lower layer.

All or some of the additives used in the present invention may be added at any stage in the process of manufacturing the magnetic and nonmagnetic coating liquids. For example, they may be mixed with the magnetic material before a kneading step; added during a step of kneading the magnetic material, the binder, and the solvent; added during a dispersing step; added after dispersing; or added immediately before coating. Part or all of the additives may be applied by simultaneous or sequential coating after the magnetic layer has been applied to achieve a specific purpose. Depending on the objective, the lubricant may be coated on the surface of the magnetic layer after calendering or making slits.

Known organic solvents may be employed in the present invention. For example, the solvents described in Japanese Unexamined Patent Publication (KOKAI) Showa No. 6-68453 may be employed. [Layer Structure]

The magnetic recording medium of the present invention has a structure in which a magnetic layer is provided on a nonmagnetic layer (ATOMM structure). The advantages of the ATOMM structure over a single-layer-structure magnetic layer are thought to be as follows:

(1) Improved electromagnetic characteristics due to the thin-film structure of the magnetic layer.
(2) Improved durability due to stable feeding of lubricant.
(3) High output due to smoothing of the upper magnetic layer.
(4) Ease of imparting required functions due to the separation of the functions of the magnetic layer.

These functions are not achieved simply by configuring the magnetic layer with multiple layers. To configure a multilayered structure, the layers are normally sequentially configured in a "sequential multilayering method". In this method, the lower layer is coated first and then cured or dried. The upper magnetic layer is then similarly coated, cured, and surface processed.

In the magnetic recording medium of the present invention, the upper and lower layers can be provided by both wet-on-wet methods (W/W), where following coating of the lower layer, the upper magnetic layer is applied while the lower layer is still wet, and wet-on-dry methods (W/D), where the upper magnetic layer is applied after the lower layer has dried. From the perspective of production yield, simultaneous or sequential wet coating is preferred, but coating following drying is also quite suitable for use. Since the upper and lower layers can be simultaneously formed by simultaneous or sequential wet application (W/W) with the multilayered structure of the present invention, a surface treatment step such as calendering can be effectively employed to improve the surface roughness of the upper magnetic layer, even when it is an ultrathin layer.

In the thickness configuration of the magnetic recording medium of the present invention, the nonmagnetic support suitably ranges from 2 to 100 $\mu$m, preferably from 2 to 80 $\mu$m. In a computer tape, a nonmagnetic support with a thickness of 3 to 6.5 $\mu$m (preferably 3 to 6 $\mu$m, more preferably 4 to 5.5 $\mu$m) can be employed.

An undercoating layer can be provided between the nonmagnetic flexible support and the nonmagnetic layer or the magnetic layer to enhance adhesion. The undercoating layer suitably has a thickness of 0.01 to 0.5 μm, preferably 0.02 to 0.5 μm. Even though the present invention is normally a two-sided disk-shaped medium in which a nonmagnetic layer and a magnetic layer are provided on both surfaces of the support, they can be provided on just one surface. In that case, a backcoat layer can be provided on the reverse side from the side on which the nonmagnetic layer and magnetic layer are provided to exercise an antistatic or curl-correcting effect. The thickness thereof ranges from 0.1 to 4 μm, preferably from 0.3 to 2.0 μm. Known undercoating layers and backcoat layers may be employed.

The thickness of the magnetic layer of the medium of the present invention is optimized based on the level of saturation magnetization of the head employed, the head gap length, or the bandwidth of the recording signal. However, this thickness is generally equal to or higher than 0.01 μm and equal to or less than 0.15 μm, preferably equal to or higher than 0.01 μm and equal to or less than 0.10 μm. The magnetic layer can be divided into two or more layers having different magnetic characteristics, in which case known multilayered magnetic layer configurations may be employed.

The thickness of the nonmagnetic lower layer of the medium of the present invention is equal to or higher than 0.2 μm and equal to or less than 5.0 μm, preferably equal to or higher than 0.3 μm and equal to or less than 3.0 μm, and more preferably, equal to or higher than 1.0 μm and equal to or less than 2.5 μm. The lower layer of the medium of the present invention is effective so long as it is essentially nonmagnetic. For example, even when a small amount of magnetic material is present in the form of impurities or for design purposes, the effect of the present invention is exhibited and the medium can be viewed as having essentially the same configuration as the present invention.

[The Backcoat Layer]

Better repeat running properties are generally demanded of magnetic tapes for recording computer data than for video tapes and audio tapes. To maintain such high running durability, the incorporation of carbon black and an inorganic powder is desirable in the backcoat layer.

Generally, the addition of microgranular carbon black achieves lowering the surface resistivity and reducing the light transmittance of the backcoat layer. Since many magnetic recording devices use the light transmittance of the tape for the operating signal, in such cases, it is particularly effective to add microgranular carbon black. Microgranular carbon black generally has good liquid lubricant retentivity, and when employed in combination with a lubricant, contributes to reducing the coefficient of friction. Coarse-granular carbon black with a particle size of 230 to 300 nm functions as a solid lubricant, forming minute protrusions on the surface of the backcoat layer, reducing the contact surface area, and contributing to reducing the coefficient of friction. However, coarse-granular carbon black has a drawback in that it tends to drop out from the backcoat layer due to sliding of the tape in systems with harsh running conditions, causing an increase in the error rate. Accordingly, it is desirable to use two types of carbon black of differing mean particle size when adding carbon black to the backcoating layer. In that case, microgranular carbon black with a mean particle size of 10 to 20 nm and coarse-granular carbon black with a mean particle size of 230 to 300 nm are desirably combined for use.

Specific examples of microgranular carbon black products are given below. The particle size of each type of carbon black is also given:

Raven 2000B (18 nm), Raven 1500B (17 nm) (both of which are manufactured by Columbia Carbon Co., Ltd.), BP800 (17 nm) (Cabot Corporation), PRINTEX 90 (14 nm), PRINTEX 95 (15 nm), PRINTEX 85 (16 nm), and Printex 75 (17 nm) (manufactured by Degusa Co.), and #3950 (16 nm) (manufactured by Mitsubishi Chemical Corp.).

Specific examples of coarse-granular carbon black products are: Thermal Black (270 nm) (manufactured by Cancarb limited.) and Raven MTP (275 nm) (manufactured by Columbia Carbon Co., Ltd.). When employing two types of carbon black having different mean particle sizes in the backcoat layer, the ratio of 10 to 20 nm microgranular carbon black to 230 to 300 nm coarse-granular carbon black incorporated is preferably (by weight), former:latter, from 98:2 to 75:25, more preferably from 95:5 to 85:15.

The content of carbon black (total content when two types of carbon black are employed) in the backcoat layer is usually 30 to 80 weight parts per 100 weight parts of binder.

Two types of inorganic powder of differing hardness are preferably used in combination. Specifically, the use of a soft inorganic powder with a Mohs hardness of 3 to 4.5 and a hard inorganic powder with a Mohs hardness of 5 to 9 is preferred. Adding a soft inorganic powder with a Mohs hardness of 3 to 4.5 permits stabilization of the coefficient of friction with repeat running. Further, within this hardness range, the slide guidepoles are not cut away. The mean particle size of the inorganic powder desirably falls within a range of 30 to 50 nm.

Examples of soft inorganic powders with a Mohs hardness of 3 to 4.5 are calcium sulfate, calcium carbonate, calcium silicate, barium sulfate, magnesium carbonate, zinc carbonate, and zinc oxide. These may be employed singly or in combinations of two or more. Of these, calcium carbonate is the compound of preference.

The content of soft inorganic powder in the backcoat layer desirably falls within a range of 10 to 140 weight parts, preferably 35 to 100 weight parts, per 100 weight parts of carbon black.

Adding a hard inorganic powder with a Mohs hardness of 5 to 9 strengthens the backcoat layer and enhances running durability. When these inorganic powders are employed in combination with carbon black or the above-described soft inorganic powder, deterioration due to repeat sliding tends to decrease and the backcoat layer is reinforced. Adding this inorganic powder imparts a suitable abrasive strength and reduces adhesion of shavings to the tape guidepoles and the like. Particularly when employed in combination with soft inorganic powder (the preferred example of which is calcium carbonate), the sliding characteristics on rough-surface guidepoles are improved and the coefficient of friction of the backcoat layer can be stabilized.

The mean particle size of the hard inorganic powder falls within a range of 80 to 250 nm, preferably 100 to 210 nm.

Examples of hard inorganic powders having a Mohs hardness of 5 to 9 are α-iron oxide, α-alumina, and chromium oxide ($Cr_2O_3$). These powders may be employed singly or in combination. Of these, the powders of preference are α-iron oxide and α-alumina. The content of hard inorganic powder is normally 3 to 30 weight parts, preferably 3 to 20 weight parts, to 100 weight parts of carbon black.

When employing the above-described soft inorganic powder and hard inorganic powder in combination in the backcoat layer, the soft inorganic powder and hard inorganic powder are desirably selected so that the difference in hardness between the soft inorganic powder and hard inorganic powder is equal to or higher than 2, preferably equal to or higher than 2.5, and more preferably equal to or higher than 3.

The above-described two types of inorganic powder having different Mohs hardnesses and specific mean particle sizes and the above-described two types of carbon black having different mean particle sizes are desirably incorporated into the backcoat layer. In this combination, the incorporation of calcium carbonate as the soft inorganic powder is particularly desirable.

Lubricants can be incorporated into the backcoat layer. The lubricants may be suitably selected from among the examples of lubricants given for use in the nonmagnetic layer or magnetic layer. Normally, 1 to 5 weight parts of lubricant are employed per 100 weight parts of binder in the backcoat layer.

[The Support]

Known films of the following may be employed as the nonmagnetic support in the present invention: polyethylene terephthalate, polyethylene naphthalate, other polyesters, polyolefins, cellulose triacetate, polycarbonate, polyamides, polyimides, polyamidoimides, polysulfones, polyaramides, aromatic polyamides, polybenzooxazoles, and the like. The use of polyethylene naphthalate, polyamides, or some other high-strength support is particularly desirable. As needed, layered supports such as disclosed in Japanese Unexamined Patent Publication (KOKAI) Heisei No. 3-224127 may be employed to vary the surface roughness of the magnetic surface and support surface. These supports may be subjected beforehand to corona discharge treatment, plasma treatment, adhesion enhancing treatment, heat treatment, dust removal, and the like.

The profile of the surface roughness of the nonmagnetic support may be controlled as needed through the size and quantity of filler added to the support. Examples of such fillers are oxides and carbonates of Ca, Si, and Ti and organic micropowders such as acrylics. The maximum height SRmax of the support is equal to or less than 1 $\mu$m, the ten-point average roughness SRz is equal to or less than 0.5 $\mu$m, the center surface peak height SRp is equal to or less than 0.5 $\mu$m, the center surface valley depth SRv is equal to or less than 0.5 $\mu$m, the center surface surface area ratio SSr is equal to or higher than 10 percent and equal to or less than 90 percent, and the average wavelength S$\lambda$ a is equal to or higher than 5 $\mu$m and equal to or less than 300 $\mu$m. To obtain desired electromagnetic characteristics and durability, the surface protrusion distribution of the support may be controlled with the filler, it being possible to control so each of 0 to 2,000 particles with a size of 0.01 to 1 $\mu$m per 0.1 mm$^2$.

The F-5 value of the support employed in the present invention is preferably 0.049 to 0.49 GPa (5 to 50 kg/mm$^2$) and the thermal shrinkage rate of the support after 30 minutes at 100° C. is preferably equal to or less than 3 percent, more preferably equal to or less than 1.5 percent. The thermal shrinkage rate after 30 min at 80° C. is equal to or less than 1 percent, preferably equal to or less than 0.5 percent. A breaking strength of 0.049 to 0.98 GPa (5 to 100 kg/mm$^2$) and a modulus of elasticity of 0.98 to 19.6 GPa (100 to 2,000 kg/mm$^2$) are desirable. The coefficient of thermal expansion is from $10^{-4}$ to $10^{-8}$/° C., preferably $10^{-5}$ to $10^{-6}$/° C. The coefficient of moisture expansion is equal to or less than $10^{-4}$/RH percent, preferably equal to or less than $10^{-5}$/RH percent. These thermal characteristics, dimensional characteristics, and mechanical strength characteristics are preferably nearly equal, differing within 10 percent, in each in-plane direction of the support.

[Manufacturing Method]

The process for manufacturing the magnetic coating material of the magnetic recording medium according to the present invention comprises at least a kneading step, a dispersing step, and a mixing step to be carried out, if necessary, before and/or after the kneading and dispersing steps. Each of the individual steps may be divided into two or more stages. All of the starting materials employed in the present invention, including the magnetic material, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. When a kneader is employed, the magnetic material or nonmagnetic powder and all or part of the binder (preferably equal to or higher than 30 percent of the entire quantity of binder) are kneaded in a range of 15 to 500 parts per 100 parts of magnetic material. Details of the kneading process are described in Japanese Unexamined Patent Publication (KOKAI) Heisei Nos. 1-106338 and 1-79274. Further, glass beads maybe employed to disperse the magnetic coating material and nonmagnetic coating material, with a dispersing medium with a high specific gravity such as zirconia beads, titania beads, and steel beads being suitable for use. The particle diameter and fill ratio of these dispersing media are optimized for use. A known dispersing device may be employed.

Methods such as the following are desirably employed when coating a multilayer structure magnetic recording medium in the present invention. In the first method, the lower layer is first applied with a coating device commonly employed to apply magnetic coating materials such as a gravure coating, roll coating, blade coating, or extrusion coating device, and the upper layer is applied while the nonmagnetic layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672. In the second method, the upper and lower layers are applied nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672. In the third method, the upper and lower layers are applied nearly simultaneously using an extrusion coating apparatus with a backup roller as disclosed in Japanese Unexamined Patent Publication (KOKAI Heisei No. 2-174965. To avoid compromising the electromagnetic characteristics or the like of the magnetic recording medium by aggregation of magnetic particles, shear is desirably imparted to the coating liquid in the coating head by a method such as disclosed in Japanese Unexamined Patent Publication (KOKAI) Showa No. 62-95174 or Japanese Unexamined Patent Publication (KOKAI) Heisei No. 1-236968. In addition, the viscosity of the coating liquid must satisfy the numerical range specified in Japanese Unexamined Patent Publication (KOKAI) Heisei No. 3-8471. Applying the lower layer, drying it, and then applying the magnetic layer thereover in a sequential multilayer coating to achieve the structure of the magnetic recording medium of the present invention is also possible, and does not compromise the effect of the present invention. However, to reduce the number of voids in the coating and improve the quality as regards dropout and the like, the above-describe simultaneous multilayer coating is preferred. The contents of these references is incorporated herein by reference.

In magnetic tapes, orientation is conducted with a cobalt magnet or solenoid in the longitudinal direction. The temperature of the drying air, the amount of air, and the coating rate are desirably controlled to regulate the drying position of the coating. A coating rate of 20 to 1,000 m/min and a drying air temperature equal to or higher than 60° C. are desirable. Further, suitable predrying may be conducted prior to entry into the magnetic zone.

Heat resistant plastic rolls such as epoxy, polyimide, polyamide, and polyimidoamide, or metal rolls, may be employed as the calendering rolls. When magnetic layers are configured on both surfaces, processing with metal rolls is preferred. The processing temperature is desirably equal to or higher than 50° C., more preferably equal to or higher than 100° C. The linear pressure is desirably equal to or higher than 200 kg/cm, more preferably equal to or higher than 300 kg/cm.

[Physical Characteristics]

When employing a ferromagnetic metal powder, the saturation magnetic flux density of the magnetic layer of the magnetic recording medium of the present invention is equal to or higher than 0.2 T (2,000 G) and equal to or less than 0.5 T (5,000 G), and when employing hexagonal ferrite, equal to or higher than 0.1 T (1,000 G) and equal to or less than 0.3 T (3,000 G). Coercivity Hc and Hr are equal to or higher than 159 kA/m (2,000 Oe), preferably equal to or higher than 159 kA/m (2,000 Oe) and equal to or less than 318 kA/m (4,000 Oe). A narrow coercivity distribution is desirable, with the SFD and SFDr desirably being equal to or less than 0.6.

Squareness is equal to or higher than 0.7, preferably equal to or higher than 0.8. The coefficient of friction of the magnetic recording medium of the present invention with the head is equal to or less than 0.5, preferably equal to or less than 0.3, over a temperature range of –10° C. to 40° C. and a humidity range of 0 to 95 percent. Surface specific resistivity is desirably $10^4$ to $10^{12}$ Ω/sq on the magnetic surface, and the charge potential is desirably from –500 to +500 V. The modulus of elasticity at 0.5 percent strain of the magnetic layer is desirably 0.98 to 19.6 GPa (100 to 2000 kg/mm$^2$) in each in-plane direction, and the breaking strength is desirably 0.098 to 0.686 GPa (10 to 70 kg/mm$^2$). The modulus of elasticity of the magnetic recording medium in each in-plane direction is desirably 0.98 to 14.7 GPa (100 to 1,500 kg/mm$^2$), and the residual strain is desirably equal to or less than 0.5 percent. The thermal shrinkage rate at any temperature under 100° C. is equal to or less than 1 percent, preferably equal to or less than 0.5 percent, and more preferably equal to or less than 0.1 percent. The glass transition temperature of the magnetic layer (maximum of loss elastic modulus of dynamic viscoelasticity measured at 110 Hz) is preferably equal to or higher than 50° C. and equal to or less than 120° C.; that of the lower nonmagnetic layer is desirably 0 to 100° C. The loss elastic modulus preferably falls within the range of $1 \times 10^3$ to $8 \times 10^4$ N/cm$^2$ ($1 \times 10^8$ to $8 \times 10^9$ dyne/cm$^2$), and the loss tangent is desirably equal to or less than 0.2. When the loss tangent is excessively large, adhesive breakdowns tend to occur. These thermal characteristics and mechanical characteristics are desirably nearly identical, varying within 10 percent, in all in-plane directions of the medium. Residual solvent contained in the magnetic layer is desirably equal to or less than 100 mg/m$^2$, preferably equal to or less than 10 mg/m$^2$. The void rate of the coated layers is desirably equal to or less than 30 volume percent, preferably equal to or less than 20 volume percent, for both the nonmagnetic lower layer and the magnetic layer. Although the void rate is desirably low to achieve high output, there are times when it is acceptable to ensure a certain value for a certain objective. For example, in disk media in which repeat applications are emphasized, a high void rate is often desirable to achieve running durability. Curling is desirably kept to within 3 mm.

It will be readily understood that when there is a nonmagnetic layer and a magnetic layer in the magnetic recording medium of the present invention, the physical characteristics of the two may be varied in the nonmagnetic layer and the magnetic layer based on the objective. For example, the modulus of elasticity of the magnetic layer can be increased to improve running durability while at the same time lowering the modulus of elasticity of the nonmagnetic layer to below that of the magnetic layer to improve the head touch of the magnetic recording medium.

[Embodiments]

<Ferromagnetic Powder>

Ferromagnetic powders employed in embodiments are as follows.

TABLE 1

| Ferromagnetic Powder | Type | Hc (kA/m) | Plate diameter or major axis length (nm) |
| --- | --- | --- | --- |
| A | BaF | 199 | 33 |
| B | BaF | 197 | 21 |
| C | BaF | 200 | 42 |
| D | BaF | 219 | 55 |
| E | MP | 187 | 70 |
| F | MP | 163 | 60 |
| G | MP | 184 | 100 |
| H | MP | 181 | 220 |
| I | MP | 148 | 90 |
| J | MP | 171 | 45 |

BaF: Barium ferrite, MP: Ferromagnetic metal powder

<Preparation of Coating Liquid>

---

Magnetic coating liquid 1 (Hexagonal ferrite: Disc)

| | |
| --- | --- |
| Barium ferrite magnetic powder: | 100 parts |
| Vinyl chloride copolymer MR 555 (Nippon Zeon Co., Ltd.) | 5 parts |
| Polyurethane resin UR8200 (Toyobo Co., Ltd.) | 3 parts |

-continued

| | |
|---|---|
| α-alumina | 10 parts |
| HIT55 (Sumitomo Chemical Co., Ltd.) | |
| Carbon black | 1 part |
| #55 (Asahi Carbon Co., Ltd.) | |
| Phenyl phosphonic acid | 2 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |

Magnetic coating liquid 2 (Hexagonal ferrite: Tape)

| | |
|---|---|
| Barium ferrite magnetic powder | 100 parts |
| Vinyl chloride copolymer | 6 parts |
| MR555 (Nippon Zeon Co., Ltd.) | |
| Polyurethane resin | 3 parts |
| UR8200 (Toyobo Co., Ltd.) | |
| α-alumina (particle size: 300 nm) | 2 parts |
| HIT55 (Sumitomo Chemical Co., Ltd.) | |
| Carbon black (particle size: 15 nm) | 5 parts |
| #55 (Asahi Carbon Co., Ltd.) | |
| Butyl stearate | 1 part |
| Stearic acid | 2 parts |
| Methyl ethyl ketone | 125 parts |
| Cyclohexanone | 125 parts |

Magnetic coating liquid 3 (Ferromagnetic metal: Disc)

| | |
|---|---|
| Ferromagnetic metal powder | 100 parts |
| Vinyl chloride copolymer | 12 parts |
| MR110 (Nippon Zeon Co., Ltd.) | |
| Polyurethane resin | 3 parts |
| UR8200 (Toyobo Co., Ltd.) | |
| α-alumina | 10 parts |
| HIT55 (Sumitomo Chemical Co., Ltd.) | |
| Carbon Black | 5 parts |
| #55 (Asahi Carbon Co., Ltd.) | |
| Phenyl Phosphonic acid | 3 parts |
| Butyl stearate | 10 parts |
| Butoxyethyl stearate | 5 parts |
| Isohexadecyl stearate | 3 parts |
| Stearic acid | 2 parts |
| Methyl ethyl ketone | 180 parts |
| Cyclohexanone | 180 parts |

Magnetic coating liquid 4 (Ferromagnetic metal: Tape)

| | |
|---|---|
| Ferromagnetic metal powder | 100 parts |
| Vinyl chloride copolymer | 12 parts |
| MR110 (Nippon Zeon Co., Ltd.) | |
| Polyurethane resin | 3 parts |
| UR8200 (Toyobo Co., Ltd.) | |
| α-alumina | 2 parts |
| HIT55 (Sumitomo Chemical Co., Ltd.) | |
| Carbon black | 1 part |
| #55 (Asahi Carbon Co., Ltd.) | |
| Butyl stearate | 1 part |
| Stearic acid | 5 parts |
| Methyl ethyl ketone | 100 parts |
| Cyclohexanone | 20 parts |
| Toluene | 60 parts |

Nonmagnetic coating liquid 5 (Nonmagnetic lower layer-use: Disc)

| | |
|---|---|
| Nonmagnetic powder $TiO_2$ Crystalline rutile | 80 parts |
| Mean primary particle diameter | 35 nm |
| Specific surface area by BET method | 40 $m^2/g$ |
| pH | 7 |
| $TiO_2$ content | 90 percent or more |
| DBP oil absorption capacity | 27 to 38 g/100 g |
| Surface treatment agent | $Al_2O_3$, 8 weight percent |
| Carbon black | 20 parts |
| CONDUCTEX SC-U (Columbia Carbon Co., Ltd.) | |
| Vinyl Chloride copolymer | 12 parts |
| MR110 (Nippon Zeon Co., Ltd.) | |
| Polyurethane resin | 5 parts |
| URR8200 (Toyobo Co., Ltd.) | |
| Phenyl phosphonic acid | 4 parts |
| Butyl stearate | 10 parts |
| Butoxyethyl stearate | 5 parts |
| Isohexadecyl stearate | 2 parts |

-continued

| | |
|---|---|
| Stearic acid | 3 parts |
| Methyl ethyl ketone/Cyclohexanone (8/2 mixing solvent) | 250 parts |
| Nonmagnetic coating liquid 6 (Nonmagnetic lower layer-use: Tape) | |
| Nonmagnetic powder $TiO_2$ Crystalline rutile | 80 parts |
| Mean primary particle diameter | 35 nm |
| Specific surface area by BET method | 40 $m^2/g$ |
| pH | 7 |
| $TiO_2$ content | 90 percent or more |
| DBP oil absorption capacity | 27 to 38 g/100 g |
| Surface treatment agent | $Al_2O_3$, 8 weight percent |
| Carbon black | 20 parts |
| CONDUCTEX SC-U (Columbia Carbon Co., Ltd.) | |
| Vinyl chloride copolymer | 12 parts |
| MR110 (Nippon Zeon Co., Ltd.) | |
| Polyurethane resin | 5 parts |
| UR8200 (Toyobo Co., Ltd.) | |
| Phenyl phosphonic acid | 4 parts |
| Butyl stearate | 1 part |
| Stearic acid | 3 parts |
| Methyl ethyl ketone/Cyclohexanone (8/2 mixing solvent) | 250 parts |

Manufacturing Method 1
Embodiments 1–6,

Comparative Examples 2–5

For each of the above-mentioned coating materials, the individual components were kneaded in a kneader and then dispersed in a sandmill for 300 min. Glass was employed for the dispersing beads. Once the dispersions had been obtained, 10 parts of polyisocyanate were added to the coating liquid for the nonmagnetic layer, 10 parts of polyisocyanate were added to the coating liquid for the magnetic layer, 40 parts of cyclohexanone were added to each, and each of the liquids was passed through a filter having a mean pore size of 1 μm to prepare nonmagnetic layer-forming and magnetic layer-forming coating liquids. Simultaneous multilayer coating was performed on a polyethylene terephthalate support with a thickness of 62 μm and a center surface average surface roughness of 3 nm by first applying the nonmagnetic layer coating liquid in a quantity calculated to yield a dry thickness of 1.5 μm and then immediately applying the magnetic layer coating liquid in a quantity calculated to yield a dry thickness of about 0.10 μm. While the two layers were still wet, the metallic ferromagnetic material employed was passed through two alternating current magnetic field generating units, one with a frequency of 50 Hz and a magnetic field intensity of 0.025 T (250 G) and the other with a frequency of 50 Hz and a magnetic field intensity of 0.012 T (120 G) to conduct random orientation. The product was then processed at a linear pressure of 300 kg/cm at a temperature of 90° C. in a seven-stage calender following drying. The product was then punched to 3.5 inches and surface polished, yielding disk media.

Manufacturing Method 2

Comparative Example 1

With the exception that the dispersion time in the sandmill was reduced by half to 150 min, disks were obtained in the same manner as in Manufacturing Method 1.

Manufacturing Method 3

Comparative Example 6

With the exceptions that steel dispersion beads were employed in the sandmill and the dispersion time was increased five-fold to 1,500 min, disks were obtained in the same manner as in Manufacturing Method 1.

Manufacturing Method 4

Comparative Example 7

With the exceptions that the nonmagnetic layer coating liquid was applied in a quantity calculated to yield a dry thickness of 1.4 μm and the magnetic layer was applied immediately thereover to a dry thickness of 0.20 μm, disks were obtained in the same manner as in Manufacturing Method 1.

Manufacturing Method 5
Embodiments 7

With the exceptions that zirconia dispersion beads were employed in the sandmill and the dispersion time was increased two-fold to 600 min, disk was obtained in the same manner as in Manufacturing Method 1.

Manufacturing Method 6
Embodiments 8–13,

Comparative Examples 9–12

Each component of the above-described coating materials was kneaded in a kneader and then dispersed for 300 min in a sandmill. Glass dispersion beads were employed. Once dispersions had been obtained, 2.5 parts of polyisocyanate were added to the nonmagnetic layer coating liquid and 3 parts of polyisocyanate were added to the magnetic layer coating liquid. Forty parts of cyclohexanone were then added to each and the liquids were passed through a filter having a mean pore size of 1 μm to prepare nonmagnetic layer-forming and magnetic layer-forming coating liquids.

Simultaneous multilayer coating was performed on an aramide support (product name: Mictron) with a thickness of 4.4 μm and a center surface average surface roughness of 2 nm by first applying the nonmagnetic layer coating liquid in a quantity calculated to yield a dry thickness of 1.7 μm and then immediately applying the magnetic layer coating liquid in a quantity calculated to yield a dry thickness of 0.15 μm. While the two layers were still wet, orientation was conducted with a cobalt magnet having a magnetic force of 0.6 T (6,000 G) and a solenoid having a magnetic force of 0.6 T (6,000 G). After drying, processing was conducted for 200 m/min at a temperature of 85° C. with a seven-stage calender comprising only metal rolls. Subsequently, a backcoat layer 0.5 μm in thickness was applied (100 parts carbon black with a mean particle size of 17 nm, 80 parts of calcium carbonate with a mean particle size of 40 nm, and 5 parts of α-alumina with a mean particle size of 200 nm were dispersed in nitrocellulose resin, polyurethane resin, and polyisocyanate). The product was slit to a width of 3.8 mm, the slit product was fed out, the product was picked up by a device having a winding unit in a manner in which nonwoven cloth and a razor blade pressed against the magnetic surface, and the surface of the magnetic layer was cleaned with a tape cleaning unit to obtain tape samples.
Manufacturing Method 7

Comparative Example 8

With the exception that the dispersion time in the sandmill was reduced by half to 150 min, tape was obtained in the same manner as in Manufacturing Method 6.
Manufacturing Method 8

Comparative Example 13

With the exceptions that steel dispersion beads were employed in the sandmill and the dispersion time was increased fivefold to 1,500 min, tape was obtained in the same manner as in Manufacturing Method 6.

Manufacturing Method 9

Comparative Example 14

With the exceptions that the nonmagnetic layer coating liquid was applied to a dry thickness of 1.4 μm and the magnetic layer coating liquid was applied immediately thereafter to a thickness of 0.20 μm, tape was obtained in the same manner as in Manufacturing Method 6.

Manufacturing Method 10

Embodiments 14,

Comparative Example 15

With the exceptions that zirconia dispersion beads were employed in the sandmill and the dispersion time was increased two-fold to 600 min, tape was obtained in the same manner as in Manufacturing Method 6.

TABLE 2

<Results of Magnetic Disk Evaluation>

|  | Magnetic powder No. | Thickness of magnetic layer(μm) | Hc of magnetic layer (kA/m) | Magnetic cluster size ($10^4$ nm$^2$) | Minimum recording wavelength (μm) | SN ratio (dB) |
|---|---|---|---|---|---|---|
| Embodiment 1 | A | 0.15 | 191 | 2.00 | 0.36 | 23.0 |
| Embodiment 2 | B | 0.10 | 195 | 0.55 | 0.36 | 24.5 |
| Embodiment 3 | C | 0.08 | 211 | 3.50 | 0.36 | 21.0 |
| Embodiment 4 | E | 0.10 | 183 | 4.30 | 0.36 | 24.0 |
| Embodiment 5 | F | 0.15 | 159 | 3.70 | 0.36 | 22.5 |
| Embodiment 6 | G | 0.06 | 184 | 5.50 | 0.36 | 20.5 |
| Embodiment 7 | J | 0.09 | 187 | 2.90 | 0.18 | 20.9 |
| Comp. Ex. 1 | A | 0.12 | 189 | 5.90 | 0.36 | 18.0 |
| Comp. Ex. 2 | D | 0.11 | 217 | 5.70 | 0.36 | 17.0 |
| Comp. Ex. 3 | G | 0.06 | 184 | 5.50 | 0.18 | 16.9 |
| Comp. Ex. 4 | H | 0.08 | 181 | 6.30 | 0.36 | 18.5 |
| Comp. Ex. 5 | I | 0.12 | 143 | 4.90 | 0.36 | 18.5 |
| Comp. Ex. 6 | E | 0.09 | 183 | 0.45 | 0.36 | 17.5 |
| Comp. Ex. 7 | E | 0.20 | 181 | 5.00 | 0.36 | 19.0 |

TABLE 3

<Results of Magnetic Tape Evaluation>

|  | Magnetic powder No. | Thickness of magnetic layer(μm) | Hc of magnetic layer (kA/m) | Magnetic cluster size ($10^4$ nm$^2$) | Minimum recording wavelength (μm) | CN ratio (dB) |
|---|---|---|---|---|---|---|
| Embodiment 8 | A | 0.10 | 201 | 3.20 | 0.36 | 2.0 |
| Embodiment 9 | B | 0.07 | 198 | 0.65 | 0.36 | 2.5 |
| Embodiment 10 | C | 0.13 | 216 | 4.60 | 0.36 | 0.5 |
| Embodiment 11 | E | 0.05 | 190 | 1.10 | 0.36 | 1.5 |
| Embodiment 12 | F | 0.07 | 167 | 0.89 | 0.36 | 1.1 |
| Embodiment 13 | G | 0.12 | 187 | 5.50 | 0.36 | 0.0 |
| Embodiment 14 | J | 0.09 | 178 | 2.70 | 0.20 | 2.7 |
| Comp. Ex. 8 | A | 0.15 | 199 | 5.70 | 0.36 | −3.3 |
| Comp. Ex. 9 | D | 0.09 | 222 | 6.00 | 0.36 | −5.2 |
| Comp. Ex. 10 | G | 0.12 | 187 | 5.50 | 0.20 | −2.8 |
| Comp. Ex. 11 | H | 0.13 | 186 | 6.90 | 0.36 | −5.6 |
| Comp. Ex. 12 | I | 0.09 | 154 | 5.10 | 0.36 | −3.9 |
| Comp. Ex. 13 | E | 0.07 | 182 | 0.43 | 0.36 | −4.9 |
| Comp. Ex. 14 | E | 0.20 | 187 | 5.20 | 0.36 | −1.8 |
| Comp. Ex. 15 | H | 0.13 | 184 | 5.30 | 0.20 | −5.1 |

[Measurement]
(1) Magnetic Characteristics (Hc, Bm, SQ)

The Hm was measured at 796 kA/m (10 kOe) with a vibrating sample magnetometer (manufactured by Tōei Kōgyō).

(2) S/N Ratio (Disks)

A recording head (MIG, gap 0.15 µm, 1.8 T) and a reproduction MR head were mounted on a spin stand and measurements were taken. The rotational speed was 2,500 to 3,500 rpm, the radius was 30 mm, and the noise was DC noise. A S/N ratio equal to or higher than 20 dB was considered good.

(3) C/N Ratio (Tapes)

A recording head (MIG, gap 0.15 µm, 1.8 T) and a reproduction MR head were mounted on a drum tester and measurements were taken. The head-medium relative velocity was 1 to 3 m/min and modulation noise was measured. A C/N ratio equal to or higher than 0.0 dB was considered good.

(4) Magnetic Layer Thickness Measurement

The magnetic recording medium was cut with a diamond cutter to a thickness of about 0.1 µm in the MD direction and the cut sample was observed and photographed at a magnification of 10,000 to 100,000 times, preferably 20,000 to 50,000 times, by transmission electron microscopy. The picture print size was A4 to A5. Subsequently, the interface was visually determined paying attention to differences in the shape of the ferromagnetic powder in the magnetic layer and the nonmagnetic powder in the lower nonmagnetic layer, the edge thereof was etched in black, and the magnetic layer surface was also etched in black. Thereafter, the length of the lines etched in black was measured with a KS400 Image Processor from Zeiss. For an image length of 21 cm, 85 to 300 measurements were taken and the average of the measurement values was calculated.

(5) Measurement of Magnetic Cluster Size

The samples obtained were subjected to a magnetic field of 796 kA/m (10 kOe) with a vibrating sample magnetometer (manufactured by Toei Kogyo). The samples were then removed and DC erased. Following erasure, the samples were measured at a lift height of 40 nm in an area of 5×5 µm with the magnetic force microscope mode of a Nanoscope III manufactured by Digital Instruments., yielding a magnetic force image. Seventy percent of the standard deviation (rms) value of the magnetic force distribution was set as the threshold value, the image was rendered binary, and only portions having a magnetic force equal to or higher than 70 percent were displayed. This image was input to an Image Processor (KS400), noise was eliminated, holes were plugged, and the average surface area was calculated.

DESCRIPTION OF EMBODIMENTS AND COMPARATIVE EXAMPLES

Embodiments 1 to 7 are examples of disks with magnetic layer thicknesses, magnetic layer Hc values, and magnetic cluster sizes falling within the ranges of claim 1, as well as the size of ferromagnetic particle contained in the ferromagnetic powder less than ½ of the minimum recording length. All the S/N ratios were 20 dB or above. It was confirmed that even with an identical dispersion time in the sand mill, the magnetic cluster size was changed by reducing the size of the magnetic material employed.

Comparative Example 1 is an example of a disk manufactured in the same manner as Embodiment 1 with the exception that the dispersion time in the sand mill was reduced by half, yielding a magnetic cluster size exceeding the range of the present invention. The S/N ratio was 18.0 dB which was lower than in any of the embodiments.

Comparative Examples 2 to 4 are examples of disks manufactured in the same manner as Embodiment 1 with the exception that the magnetic material was changed from A to D, G or H, yielding magnetic cluster sizes exceeding the range of the present invention. The S/N ratio was 17.0 dB in Comparative Example 2, 16.9 dB in Comparative Example 3, and 18.5 dB in Comparative Example 4, all of which were lower than in any of the embodiments.

Comparative Example 5 is an example of a disk manufactured in the same manner as in Embodiment 1 with the exception that the magnetic material was changed from A to I. The magnetic layer thickness and magnetic cluster size were both within the ranges of the present invention, but a magnetic material with a low Hc of 148 kA/m was employed, therefore the Hc of the magnetic layer was 143 kA/m, falling below the range of the present invention. The S/N ratio, at 18.5 dB, was lower than in any of the embodiments.

Comparative Example 6 is an example of a disk manufactured under the same conditions as in Embodiment 1 with the exceptions that steel dispersion beads were used instead of glass in the sand mill, the dispersion time was five times the original time, and the magnetic material was changed from A to E, yielding a magnetic cluster size falling below the range of the present invention. Comparative Example 7 is an example of a disk manufactured in the same manner as in Embodiment 1 with the exceptions that the magnetic material was changed from A to E and the nonmagnetic layer-forming coating liquid and magnetic layer-forming coating liquid were applied in a manner yielding dry thicknesses differing from those in Embodiment 1, yielding a magnetic layer thickness exceeding the range of the present invention. The S/N ratio was 17.5 dB in Comparative Example 5 and 19.0 dB in Comparative Example 6, both of which were lower than in any of the embodiments.

Embodiments 8 to 14 are examples of tapes with magnetic layer thicknesses, magnetic layer Hc values, and magnetic cluster sizes falling within the scope of claim 1 as well as the size of ferromagnetic particle contained in the ferromagnetic powder less than ½ of the minimum recording length. All of the C/N ratios were equal to or greater than 0 dB. It was confirmed that even with an identical dispersion time in the sand mill, the magnetic cluster size was changed by reducing the size of the magnetic material employed.

Comparative Example 8 is an example of a tape manufactured in the same manner as in Embodiment 8 with the exception that the dispersion time in the sand mill was reduced by half, resulting in a cluster size exceeding the range of the present invention. The C/N ratio was −3.3 dB, which was lower than in any of the embodiments.

Comparative Examples 9 to 11 are examples of tape manufactured in the same manner as in Embodiment 8 with the exception that the magnetic material was changed from A to D, G or H, resulting in a magnetic cluster size exceeding the range of the present invention. The S/N ratio was −5.2 dB in Comparative Example 9, −2.8 dB in Comparative Example 10 and −5.6 dB in Comparative Example 11, all of which were lower than in any of the Embodiments.

Comparative Example 12 is an example of a tape manufactured in the same manner as in Embodiment 7 with the exception that the magnetic material was changed from A to I. The magnetic layer thickness and magnetic cluster size were both within the ranges of the present invention, but a magnetic material with a low Hc of 148 kA/m was employed, therefore the magnetic layer Hc was 154 kA/m, falling below the range of the present invention. The C/N ratio was −3.9 dB, which was lower than in any of the embodiments.

Comparative Example 13 is an example of a tape manufactured under the same conditions as in Embodiment 8 with the exceptions that steel dispersion beads were employed instead of glass in the sand mill, the dispersion time was five times the original time, and the magnetic material was changed from A to E, yielding a magnetic cluster size falling below the range of the present invention. Comparative Example 14 is an example of a tape manufactured in the same manner as in Embodiment 8 with the exceptions that the magnetic material was changed from A to E and the nonmagnetic layer-forming coating liquid and the magnetic layer-forming coating liquid were applied in a manner yielding different dry thicknesses from Embodiment 8, resulting in magnetic layer thicknesses exceeding the ranges of the present invention. The C/N ratio was −4.9 dB in Comparative Example 13 and −1.8 dB in Comparative Example 14, both of which were lower than in any of the Embodiments.

Comparative Example 15 is an example of a tape in which the same magnetic material was used as Comparative Example 11 but dispersion was enhanced, yielding a magnetic cluster size of $5.3 \times 10^4$ nm$^2$. However, since the major axis length of the magnetic material exceeded ½ of the minimum recording wavelength, the C/N ratio was significantly reduced in recording at a short wavelength.

The present invention provides a magnetic recording medium in which the S/N or C/N ratio is high and medium noise is suppressed. The magnetic recording medium of the present invention can be employed as a digital signal recording disk or tape loaded in a device having an MR reproduction head, yielding a magnetic recording medium with good high-density characteristics.

The present disclosure relates to the subject matter contained in Japanese Patent Application No. 2001-093908 filed on Mar. 28, 2001 and Japanese Patent Application No. 2002-063599 filed on Mar. 8, 2002, which are expressly incorporated herein by reference in its entirety.

What is claimed is:

1. A magnetic recording medium, comprising:
   an essentially nonmagnetic lower layer; and a magnetic layer comprising a ferromagnetic powder and a binder, the magnetic layer located over the lower layer,
   wherein said magnetic layer has a thickness ranging from 0.01 to 0.15 μm and a coercivity equal to or higher than 159 kA/m, and the ferromagnetic particles contained in the ferromagnetic powder have a size less than 0.15 μm, and an average size of magnetic cluster at DC erase is equal to or higher than $0.5 \times 10^4$ nm$^2$ and less than $5.5 \times 10^4$ nm$^2$, and wherein the essentially non-magnetic lower layer has either no magnetic properties or magnetic properties to a degree not affected by recording information to the magnetic layer.

2. The magnetic recording medium of claim 1, wherein said ferromagnetic powder is a ferromagnetic metal powder.

3. The magnetic recording medium of claim 2, wherein said ferromagnetic metal powder has a mean major axis length equal to or less than 0.08 μm and an acicular ratio equal to or higher than 5.

4. The magnetic recording medium of claim 1, wherein said ferromagnetic powder is a hexagonal ferrite powder.

5. The magnetic recording medium of claim 4, wherein said hexagonal ferrite powder has a mean plate diameter equal to or less than 42 nm.

6. The magnetic recording medium of claim 1, wherein said coercivity ranges from 159 to 318 kA/m.

7. The magnetic recording medium of claim 1, wherein said coercivity ranges from 159 to 279 kA/m.

8. The magnetic recording medium of claim 1, wherein said magnetic layer has a thickness ranging from 0.01 to 0.10 μm.

9. The magnetic recording medium of claim 1, wherein said magnetic layer has a thickness ranging from 0.02 to 0.08 μm.

10. The magnetic recording medium of claim 1, wherein said magnetic recording medium is a disk.

11. The magnetic recording medium of claim 1, wherein said magnetic recording medium is a tape.

12. A method of use of the magnetic recording medium of claim 10, wherein reproduction of digital signal is conducted from said disk with an MR reproduction head.

13. A method of use of the magnetic recording medium of claim 11, wherein reproduction of digital signal is conducted from said tape with an MR reproduction head.

14. The magnetic recording medium of claim 1, wherein the ferromagnetic particles in the ferromagnetic powder have a size less than about 0.1 μm.

15. A system for recording information, comprising:
   a recording signal generator which is constructed to generate a signal for recording information on a magnetic recording medium, said signal having a recording wavelength; and
   a magnetic recording medium, comprising an essentially nonmagnetic lower layer and a magnetic layer comprising a ferromagnetic powder and a binder, the magnetic layer located over the lower layer, wherein said magnetic layer has a thickness ranging from 0.01 to 0.15 μm and a coercivity equal to or higher than 159 kA/m, and the ferromagnetic particles contained in the ferromagnetic powder have a size less than ½ of the minimum recording wavelength, and an average size of magnetic cluster at DC erase is equal to or higher than $0.5 \times 10^4$ nm$^2$ and less than $5.5 \times 10^4$ nm$^2$, and wherein the essentially non-magnetic lower layer has either no magnetic properties or magnetic properties to a degree not affected by or affecting recording information to the magnetic layer.

16. The system of claim 15, wherein the signal for recording information has a minimum recording wavelength from about 0.1 to 0.5 μm.

17. The system of claim 15, wherein the signal for recording information has a minimum recording wavelength from about 0.1 to 0.3 μm.

18. A method of recording information, comprising:
   recording information with a signal having a minimum recording wavelength to a magnetic recording medium;
   said recording medium having an essentially nonmagnetic lower layer; and
   said recording medium having a magnetic layer comprising a ferromagnetic powder and a binder over the lower layer, wherein said magnetic layer has a thickness ranging from 0.01 to 0.15 μm and a coercivity equal to or higher than 159 kA/m, and the ferromagnetic particles contained in the ferromagnetic powder have a size less than 0.15 μm, and an average size of magnetic cluster at DC erase is equal to or higher than $0.5 \times 10^4$ nm$^2$ and less than $5.5 \times 10^4$ nm$^2$, and wherein the essentially non-magnetic lower layer has either no magnetic properties or magnetic properties to a degree not affected by recording information to the magnetic layer.

19. The method of claim 18, wherein said minimum recording wavelength ranges from about 0.1 to 0.5 μm.

* * * * *